United States Patent [19]
Patterson

[11] Patent Number: 4,693,267
[45] Date of Patent: Sep. 15, 1987

[54] SELF-VENTING PRESSURE REDUCING REGULATOR

[75] Inventor: Daryll D. Patterson, Brooklyn Park, Minn.

[73] Assignee: Tescom Corporation, Elk River, Minn.

[21] Appl. No.: 846,286

[22] Filed: Mar. 31, 1986

[51] Int. Cl.[4] ........................................... G05D 16/10
[52] U.S. Cl. ............................. 137/116.5; 137/505.42
[58] Field of Search ............ 137/116.5, 505.11, 505.42; 251/368

[56] References Cited

U.S. PATENT DOCUMENTS

| | | | |
|---|---|---|---|
| 2,301,031 | 11/1942 | Ferguson | 137/505.42 X |
| 2,522,913 | 9/1950 | Westman | 137/116.5 |
| 2,612,728 | 10/1952 | Jacobsson | 137/505.42 |
| 2,783,769 | 3/1957 | Philbrick | 137/116.5 |
| 2,806,481 | 9/1957 | Faust | 137/116.5 |
| 3,542,052 | 11/1970 | Irwin | 137/116.5 |
| 3,658,082 | 4/1972 | Di Tirro | 137/116.5 |
| 3,757,816 | 9/1973 | Price | 251/368 X |
| 3,906,982 | 9/1975 | Fleischhacker et al. | 137/116.5 |
| 3,926,204 | 12/1975 | Earl | 137/116.5 |
| 4,111,222 | 9/1978 | Hassell | 137/116.5 X |
| 4,596,264 | 6/1986 | Gladstone et al. | 137/116.5 X |

FOREIGN PATENT DOCUMENTS

| | | | |
|---|---|---|---|
| 2510235 | 9/1976 | Fed. Rep. of Germany | 137/116.5 |
| 1263971 | 5/1961 | France | 137/116.5 |
| 649478 | 1/1951 | United Kingdom | 137/116.5 |

Primary Examiner—Martin P. Schwadron
Assistant Examiner—Stephen M. Hepperle
Attorney, Agent, or Firm—Clayton R. Johnson

[57] ABSTRACT

A pressure regulator that includes a regulator body having a main bore that has a plurality of progressively reduced diameter bore portions in one axial direction, inlet and outlet ports and a vent passage opening to the main bore, a valve assembly resiliently retained in a closed condition to block fluid flow between the inlet and outlet ports, sensor mechanism in the main bore between a main chamber and the dome chamber of a dome threaded on the body that is axially movable by spring pressure and reference pressure applied through a reference port in the dome toward the valve assembly, and a ball connector between the sensor mechanism and valve assembly that blocks fluid flow from the main chamber to vent bores in the sensor mechanism that open to the vent passage and operates the valve assembly to an open condition when the outlet pressure is more than a preselected value above the reference pressure, permits fluid passage from the main chamber to the vent bores and the valve assembly to block flow from the inlet port to the main chamber when the outlet-reference pressure differential is below a preselected value, and to block fluid flow from the main chamber to the vent bores and permit the valve assembly to close when the outlet-reference pressure differential is a preselected value and there is no outlet pressure flow. Tungsten carbide seats are provided in each of the valve assembly and the sensor bores.

11 Claims, 6 Drawing Figures

4,693,267

SELF-VENTING PRESSURE REDUCING REGULATOR

BACKGROUND OF THE INVENTION

A pressure regulator for reducing pressure, maintaining a desired pressure differential between a reference pressure and an outlet pressure that is greater than the reference pressure and venting excess pressure from the regulator main chamber.

U.S. Pat. No. 3,906,982 to Fleischhacker et al discloses a pressure regulator that permits venting of excess fluid pressure from the main chamber to the dome chamber and thence to the ambient atmosphere when the pressure in the main chamber becomes to high, but is not utilized with a reference fluid pressure. Also prior to this invention there have been provided a piston sensed, dome loaded, spring biased differential pressure regulator to provide an outlet pressure of a preselected greater value than the reference pressure and that permitted venting of the outlet pressure through the regulator to the ambient atmosphere when the outlet-reference pressure differential decreased below a preselected value.

In order to provide improvements in a pressure regulator of the type referred to in the preceeding sentence, this invention has been made.

SUMMARY OF THE INVENTION

A pressure regulator having a regulator body with a main bore which in part forms part of a main chamber, an inlet port and a vent passage opening to the ambient atmosphere, a valve assembly that is operable to permit pressurized fluid flow from the inlet port to the main chamber and alternately block fluid flow therethrough, the valve assembly including a first valve seat and a seat retainer mounted by the body and mounting the first valve seat, a sensor mount mounted in the main bore that in turn mounts a sensor for axial movement, the sensor having a vent passage that opens to the main chamber and is in part defined by a second valve seat, the sensor passage opening to a vent passage in the sensor mount that in turn opens to the body passage, a dome mounted by the regulator body and having a dome chamber opening to the sensor and a reference pressure port opening to the dome chamber, a spring assembly in the dome chamber to bias the sensor toward the valve assembly and a control member moved by movement of the sensor to open the valve assembly to maintain a substantially constant pressure differential between the outlet and reference pressures and block fluid flow from the main chamber to the vent passages, except when the reference pressure drops relative to the outlet pressure and than permit outlet pressure flow from the main chamber to the vent passages and permit the valve assembly to block fluid flow from the inlet port to the main chamber, the valve seats and members for blocking fluid flow through the valve seats being of a hard material such as tungsten carbide to help prevent errosion in the seat area, especially when the valve assembly is not fully open.

One of the objects of this invention is to provide new and improvements in a pressure regulator of the type to maintain a substantially constant pressure differential between a reference pressure and the outlet pressure wherein the outlet pressure is greater than the reference pressure. In furtherance of the above object it is another object of this invention to provide new and novel valving means for controlling fluid flow from the regulator inlet port to the main chamber and from the main chamber to a vent passage that opens exterior of the regulator and for aiding in the minimization of errosion in the area of the valving means.

Figure 5:
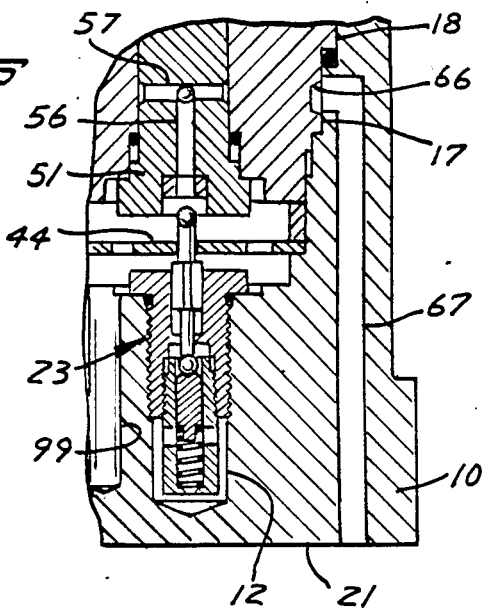
FIG. 5 is a fragmentary cross sectional view showing the vent passage in the regulator body.
Figure 1:
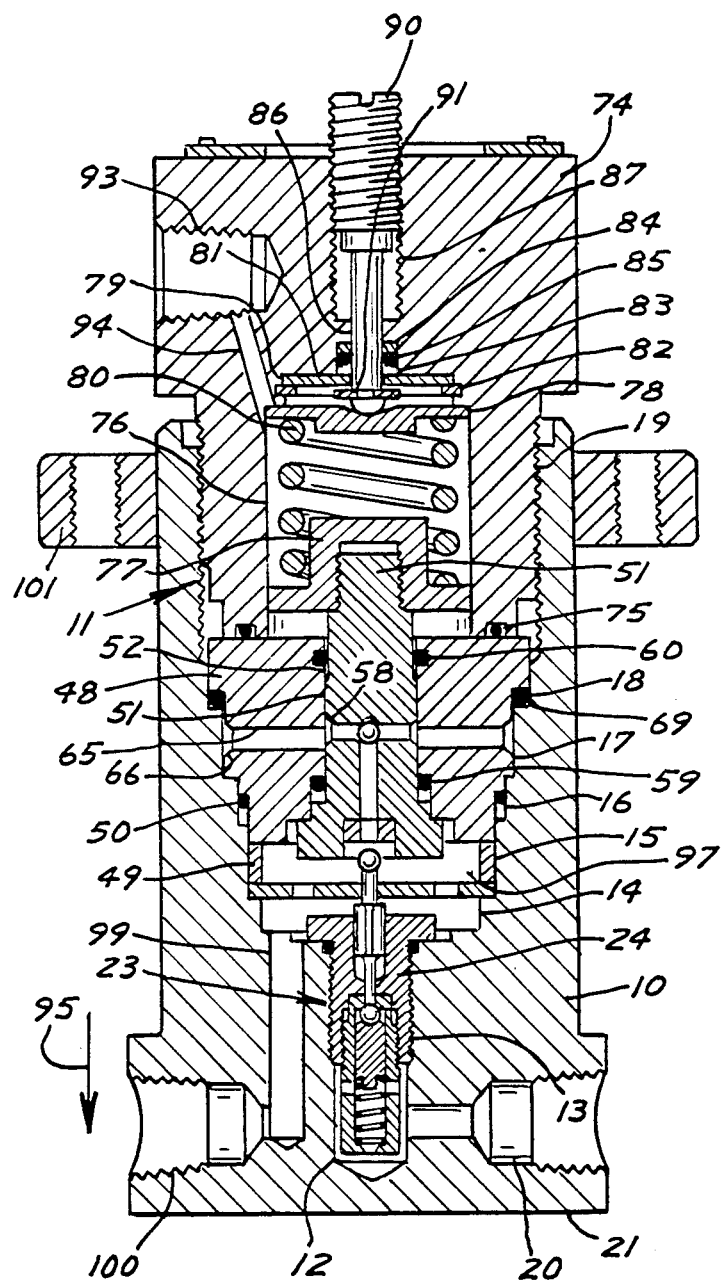
FIG. 1 is a cross sectional view of the pressure regulator of this invention shown in a mode for blocking fluid flow from the inlet port to the outlet port and permitting outlet pressure fluid flow being vented to the atmosphere.
Figure 6:
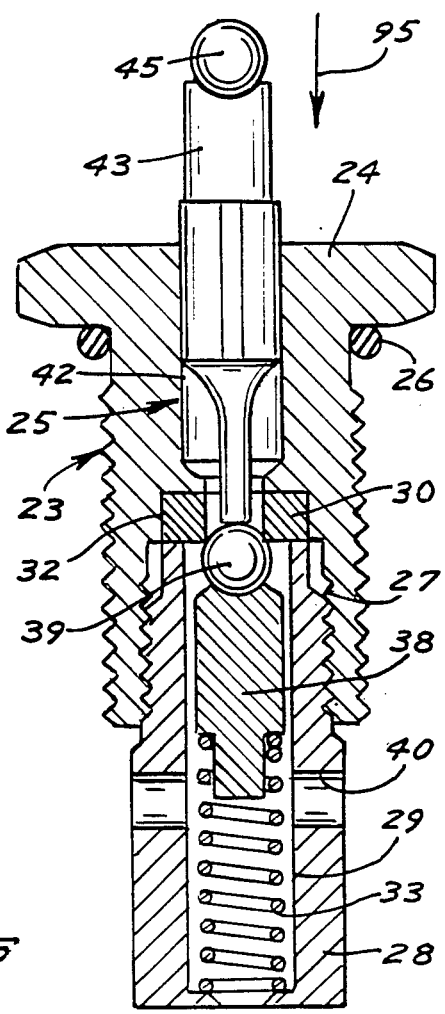
FIG. 6 is an enlarged fragmentary cross sectional view of the main valve assembly.
Figure 2:
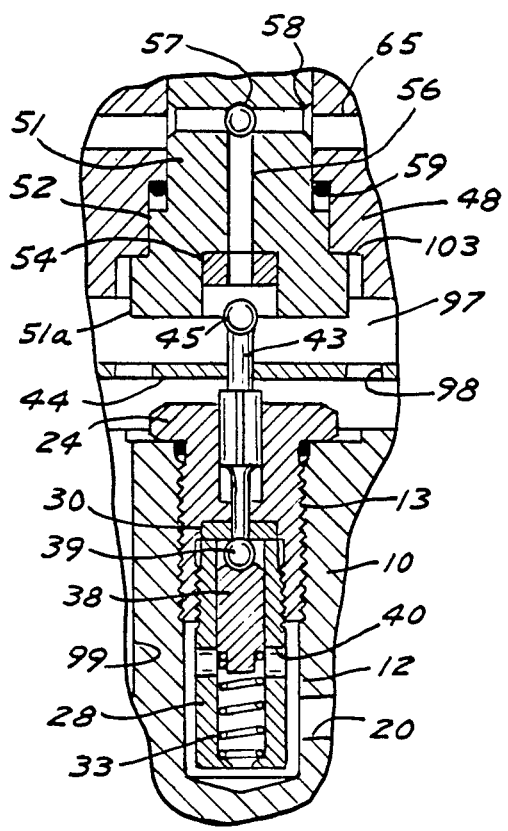
FIG. 2 is an enlarged fragmentary cross sectional view of a portion of the regulator of FIG. 1 showing the apparatus in the same mode as shown in FIG. 1.

Referring to the drawings, the pressure regulator of this invention includes a regulator body 10 having an axially elongated main bore, generally designated 11, that at one end opens through one exterior body surface and an axially opposite end that terminates in spaced relation to the surface 21 of the body that is opposite said one surface. Bore 11 includes a plurality of axially aligned bore portions 12–19 that are of progressively smaller diameters in the axial direction toward surface 21. Bore portion 12 which is of the smallest diameter and is most closely adjacent to surface 21 is in fluid communication with the inlet (high) pressure port 20. Bore portion 12 opens to bore portion 13 in which there is threadedly mounted the main valve assembly, generally designated 23.

The valve assembly 23 includes a seat retainer 24 having a bore, generally designated 25, extended therethrough, there being provided an O-ring 26 to form a fluid seal between the retainer and a wall portion of the valve body that in part defines bore 11. Retainer 24 has external threads that form a mating fit with the threads of bore portion 13 and an internally threaded bore portion 27 of bore 25 that forms a mating fit with the threaded end portion of spring retainer 28. Retainer 28 has a bore 29 extending axially therethrough. One annular edge portion of the spring retainer abuts against a tungsten carbide valve seat 30 to retain the seat in the axially intermediate bore portion 32 of bore 25 of the seat retainer.

The bore 29 which opens to the seat 30 at its end opposite the seat has a reduced diameter portion against which one end of a coil spring 33 is seted. The opposite end of the spring abuts against one end of a plunger 38 while the opposite end of the plunger has a spherical ball 39 fixed thereto to be resiliently retained in abutting engagement with the main valve seat 30 to block fluid flow therethrough. There is an annular clearance between the non-threaded end portion of the spring retained and the wall defining bore portion 12 to permit fluid flow from the inlet to the cross ports 40 in the spring retainer to flow therethrough into the axial bore 29 and thence through the annular clearance between the plunger and spring retainer to the valve seat.

Extending through the outlet bore portion 42 of bore 25 is an axially elongated connector 43 that has a reduced diameter end portion extending through the main valve seat to abut against ball 39, an axial intermediate portion of a cross sectional shape to retain the connector in substantially axial alignment with the central axis of bore 11 while providing clearance passages with the wall defining bore portion 42 and an opposite end portion extending through the central aperture of the separation plate 44. The diameter of the separation plate aperture is of a size to abut against the intermediate portion of the connector when the connector moves away from ball 39. A spherical ball 45 is fixed to the end of the connector that is opposite ball 39 and on the opposite side of plate 44 from the intermediate portion of the connector. The axial movement of the connector is limited by its intermediate portion abutting against the separation plate and the shoulder formed at the end of bore portion 42 that is adjacent seat 30. Plate 44 abuts against the shoulder formed by the juncture of bore portions 14, 15, a ring 49 abutting against the plate opposite said shoulder. A sensor back-up 48 is located in bore portions 15-19 and has its minimum diameter end portion abutting against the spacer ring 49 which in turn abuts against the plate 44. An O-ring 50 forms a fluid seal between the sensor back-up and the wall defining bore portion 16. A sensor (piston) 51 extends axially through the sensor back-up bore 52 and at the end portion adjacent to ball 45 has a bore in which there is seated a vent valve seat 54 to be closed by ball 45 when the ball abuts thereagainst. The valve seat bore opens to a reduced diameter bore 56 in the sensor that extends axially away from the valve seat to open to the sensor cross bores 57 which in turn are in fluid communication with the annular groove 58 that is formed in sensor. Groove 58 is axially between O-rings 59, 60 which form a fluid seal between the axially elongated, axial intermediate portion of the sensor and the wall that defines the minimum diameter portion of the sensor back-up bore 51.

When the sensor maximum portion 51a abuts against the shoulder 103 formed by the maximum and intermediate diameter bore portions of bore 51 to limit the axial movement of the sensor away from plate 44, groove 58 opens to the transverse bores 65 formed in the sensor back-up which in turn open to an annular groove 66 formed in the sensor back-up to open toward the wall defining bore portion 17 and to the adjacent end of the vent passage 67 formed in the regulator body. The opposite end of the vent passage 67 opens through the surface 21 of the regulator body to the ambient atmosphere. An O-ring 69 forms a fluid seal between the sensor back-up and the bore wall portion 18, O-ring 69 being on the side of groove 66 that is axially opposite O-ring 50.

A dome 74 has a threaded portion threaded into bore portion 19 to have its annular one end portion in abutting relationship with the sensor back-up to retain it in abutting relationship with the spacer ring 49. The dome has an axially extending bore (dome chamber) 76 that opens through said annular one end portion to the sensor back-up (sensor mount) 48, an O-ring 75 being provided in a groove in said annular one end portion to form a fluid seal between the dome and sensor back-up in surrounding relationship to the opening of the bore 76 to the sensor back-up.

The sensor 51 has a threaded end portion extended into bore 76 on which there is threaded a spring pad 77. One end of a coil spring 80 abuts against the spring pad 77 to resiliently urge it axially toward the main valve assembly 23 while the opposite end of the spring abutts against a button 78 to urge it toward the shoulder formed at the juncture of bore 76 and an intermediate diameter dome bore 79 that opens to the bore 76.

A washer 81 is retained in abutting relationship to a shoulder formed by the juncture of a further reduced diameter bore 83 and bore 79 by a retainer ring 82 that extends into an annular groove that opens to bore 83. A back-up ring 84 and an O-ring 85 are provided in bore 83, bore 83 opening to a minimum diameter dome bore 86. Bore 86 opens to a bore 87 that is defined by a threaded wall portion of the dome and opens through the end of the dome axially opposite bore 76.

An adjusting screw 90 has one end portion in threaded relationship to bore 87, a reduced diameter, axially intermediate portion extended through bores 86, 83 and into bore 79 and an opposite end portion that has a partial spherical head to abut against button 78 on the side opposite spring 80. A snap ring 91 is mounted in an annular groove in the adjusting screw to abut against the head of the screw and the retainer ring 82 to limit the unthreading of the adjusting screw.

A reference pressure port 93 that is provided in the dome is fluidly connected by a passage 94 to bore (dome chamber) 76. The reference pressure in combination with the spring 80 act to axially move the sensor 51 in a direction of arrow 95 toward the main valve assembly 23. The movement of the sensor in this direction is limited by spring pad 77 abutting against the sensor back-up, the fluid pressure required to move the sensor in this direction against an oppositely direct force in part depending upon the extent the adjusting screw is threaded into bore 87. The adjusting screw thus provides means for adjustably varying the desired pressure differential between the outlet pressure and the reference pressure.

Part of the regulator body wall defining bore portion 14, ring 49, the sensor, the sensor back-up, valve seat 54 and seat retainer 24 define a main chamber 97 with plate 44 extending transversely thereacross. Apertures 98 are provided in plate 44 to permit fluid flow through the plate apertures from one axial portion of the chamber to the other. A fluid passage 99 fluidly connects the main chamber 97 to the outlet port 100 in the regulator body. A mounting ring 101 is secured to the regulator body.

Figure 3:
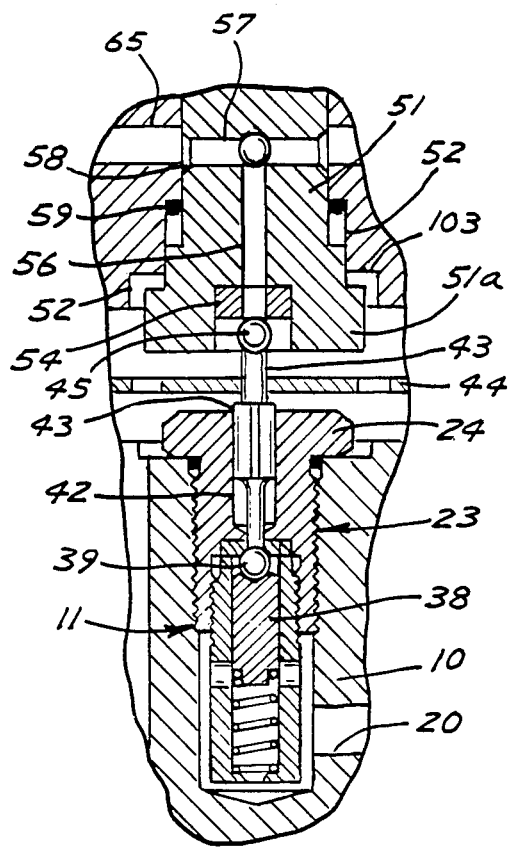
FIG. 3 is an enlarged fragmentary cross sectional view of nearly the same portion of the regulator shown in FIG. 2 other than for being shown in a mode for blocking fluid flow from the inlet port to the outlet port and outlet pressure fluid flow venting to the atmosphere.
Figure 4:
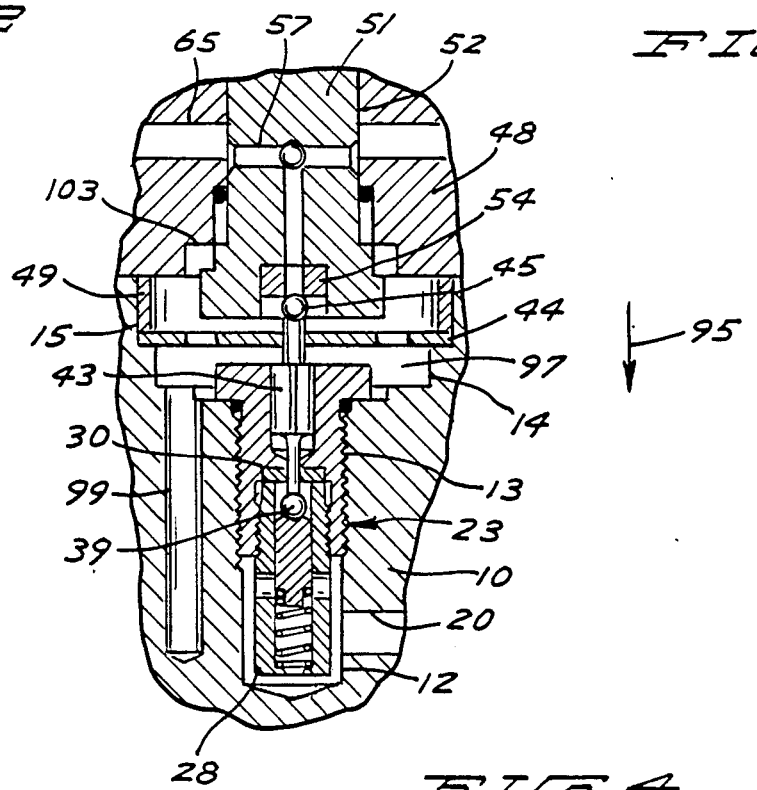
FIG. 4 is an enlarged fragmentary cross sectional view of nearly the same portion of the regulator shown in FIG. 2 other than for being shown in a mode permitting fluid flow from the inlet port to the outlet port and blocking outlet pressure fluid flow to the vent passages.

In use with fluid under pressure being applied from a source (not shown) to the inlet port, the outlet port 100 being fluidly connected to the apparatus (not shown) to which fluid under reduced pressure is to be supplied and the reference pressure port 93 fluidly connected to the source of reference pressure (not shown), the adjustment screw 90 is turned until the desired pressure differential is obtained, for example to maintain the outlet pressure a substantially constant 200 PSIG greater than the reference pressure. Now if the reference pressure is constant, there is no fluid flow from the outlet port and the pressure differential between the reference and outlet pressures is the desired value, the system is in equilibruim with the force exerted by spring 82 and the reference pressure having moved the sensor sufficiently in the direction of arrow 95 to move seat 54 to abut against ball 45 to block fluid flow from the main chamber 97 to bore 56; but at the same time not sufficiently that the connector 43 is moved in the same direction to overcome the force of spring 33 and the inlet pressure to move ball 39 away from seat 30 to permit fluid flow from the inlet port to the main chamber (see FIG. 3 condition). However assuming now that the outlet pressure decreases while the reference pressure remains constant, or the outlet pressure remains constant while the reference pressure increased, the forces acting on the sensor to move the sensor in the direction of arrow 95 are greater than those acting to move the sensor in the opposite direction. As a result while ball 45 blocks flow from the main chamber through seat 54, the sensor moves in the direction of arrow 95 to force the ball 45 and connector 43 to move ball 39 away from seat 32 such as shown in FIG. 4. Now fluid flows from the inlet port, through seat 30 and bore 42 to the main chamber and thence through passage 99 to port 100. The rate of such fluid flow depends on the requirements of the apparatus to which the outlet port is connected and the desired pressure differential that is to be maintained. In low fluid situations the spacing of ball 39 from the seat 30 is relatively small and accordingly a high velocity flow occurs in the area of seat 30. In order to avoid having to relatively frequently replace valve seats and the spherical ball members 38, 39 and 43, 45, it is preferred that the valve seats and balls be made of tungsten carbide.

In the event the pressure differential between the outlet and reference pressure decreases below the desired value the pressure in the main chamber will result in the sensor moving in the direction opposite arrow 95 whereby if the main valve assembly is open, the inlet pressure and spring 33 will result in ball 39 being moved to block fluid flow through seat 30, and thereby connector 43 and ball 45 to the position of FIG. 3. Further as the sensor moves axially in the direction opposite arrow 95 from its portion of FIG. 3, it now moves away from ball 45. As a result fluid flows from the main chamber and through bores 56, 57, 65 and vent passage 67 to the ambient atmosphere until the pressure drop in the main chamber is sufficient to restore the desired pressure differential. The maximum movement of the sensor in the direction opposite arrow 95 is limited by the sensor abutting against the shoulder 103 of the sensor mount 48, the movement of the sensor in the direction of arrow 95 being limited by button 77 abutting against the sensor mount, or in the event button 77 is not fully threaded on the sensor, by the sensor abutting against plate 44. As the excess pressure in the main chamber decreases sufficiently relative to the reference pressure, the sensor again moves in the direction of arrow 95 as a result of the pressure in the dome chamber and force of spring 80 until the sensor seat abuts against ball 45 to prevent further fluid flow through the vent valve seat.

By venting the excess pressure fluid to the atmosphere, instead of having the excess pressure fluid being vented to the dome chamber, the reference fluid may be different from the inlet pressure fluid and there would be no mixing of the two fluids. Also there is obtained a greater stability of operation in that "hunting" is avoided such as may occur when the excess pressure fluid is vented to be mix with the reference pressure fluid. Additionally with the venting to the atmosphere, downstream regulation can be obtained, even with a decreasing reference pressure.

It is preferred that the connector 43 and plunger 38 be made of a softer metal material than the tungsten carbide seats and balls, for example stainless steel, in order to make the regulator more shock resistant.

What is claimed is:

1. A pressure regulator adapted to be connected to sources of inlet and reference pressures and provide an outlet pressure that is higher than the reference pressure, comprising a regulator body having opposite first and second exterior surfaces, a main bore that is axially elongated, has a first end opening through the second surface, an axially opposite end axially intermediate said surfaces, a first end bore portion, a second bore portion that at least in part defines a main valve chamber, is of a larger minimum diameter than the first end bore portion and opens to the first end bore portion, a third bore portion having a minimum diameter larger than the maximum diameter of the second bore portion and opens thereto, and a fourth bore portion having a minimum diameter larger than the maximum diameter of the third bore portion, opens to the third bore portion and opens through the second surface, an inlet port that opens through the first bore portion to the main bore, an outlet port in fluid communication with the main chamber, and a vent passage that opens to the third bore portion and through the valve regulator body to the ambient atmosphere, the regulator body having a wall portion closing the axial opposite end of the main bore, operable main valve means mounted in the first bore portion that is resiliently retained in a closed condition to block fluid flow from the first bore portion to the main chamber and is operable to permit fluid flow from the first bore portion to the main chamber, a dome mounted by the body to extend within the fourth bore portion and having a dome chamber opening axially toward the third bore portion and a reference pressure passage opening to the ambient atmosphere and to the dome chamber, a sensor mount mounted by the body in fluid sealing relationship with the dome and body and having an axially elongated bore opening to the dome chamber and the main chamber and a vent passage for placing the mount bore in fluid communication with the body vent passage, the sensor mount at least in part being located within the third bore portion, a control member mounted by the valve means for axial movement relative thereto to operate the valve means from its closed condition to an open condition, sensor means having a vent passage opening to the mount vent passage and toward the main chamber and extended within the mount bore in fluid sealing relationship therewith for movement axially between a first position spaced from the control member to provide an open fluid passage from the main chamber to the sensor mount passage when the reference pressure decreases in relationship to the outlet pressure to provide an outlet reference pressure differential that is less than a preselected value whereby fluid flows from the main chamber to the vent passages and permits the valve means blocking fluid flow from the inlet port to the main chamber, a second position abutting against the control member to have the control member block fluid flow from the main chamber to the sensor means vent passage and the valve means remain in its closed condition when the pressure differential between the outlet and reference pressure is within a limited range of the preselected pressure differential, and a third position for cooperating with the control member to block fluid flow from the main chamber to the vent passages and operate the valve means to an open condition when the outlet pressure decreases to increase the pressure differential between the outlet and reference pressures more than a preselected amount, and spring means with the dome chamber for resiliently urging the sensor means toward the control member.

2. The pressure regulator of claim 1 further characterized in that the sensor means and sensor mount have cooperating annular shoulders to limit the axial movement of the sensor means in a direction away from the control member and that the dome abuts against the sensor mount.

3. The pressure regulator of claim 1 further characterized in that the valve means includes a seat retainer removably mounted in the first bore portion and having a bore extending axially therethrough, a valve seat, the retainer bore having bore portions of different diameters to mount the valve seat, a valve member for blocking fluid flow from the first bore through the valve seat and to the main chamber, and means mounted by the seat retainer for resiliently retaining the valve member in a position to block fluid flow through the valve seat, the control member being movably extended into the seat retainer and the valve seat for moving the valve member away from the valve seat when the sensor means is moved to its third position.

4. The pressure regulator of claim 3 further characterized in that the resilient retaining means includes a spring retainer mounted by the seat retainer and having a bore extending axially therethrough to open to the seat retainer bore and to the first bore portion and that provides an annular shoulder, and a coil spring abutting against the last mentioned shoulder and the valve member to resiliently retain the valve member in abutting relationship to the valve seat.

5. The pressure regulator of claim 3 further characterized in that the sensor means includes a vent seat, that the valve member comprises a plunger abutting against the spring and a spherical ball fixed to the plunger for abutting against the valve seat, that the control member includes an axially elongated connector extended into the seat retainer bore and the valve set to abut against the first spherical ball for moving it away from the valve seat to permit fluid flow from the inlet port to the main chamber and being movable relative to the first ball, and a second spherical ball fixed to the connector to abut against the vent seat to block fluid flow from the main chamber to the vent passages when the sensor means is in each of its second and third positions.

6. The regulator of claim 5 further characterized in that each of the vent and valve seats and each of the spherical balls is made of tungsten carbide.

7. A pressure regulator adapted to be connected to sources of inlet pressure and outlet pressure and provide a source of outlet pressure, comprising a regulator body having an exterior surface, an axially elongated main bore having an end portion opening through said surface, an axially opposite portion and an axially intermediate portion that in part defines a main chamber, a vent passage having one end opening through the regulator body to the ambient atmosphere and an opposite second end opening to the main bore axially between the main chamber and said end portion, an inlet port opening to said axially opposite portion, and an outlet port opening to said main chamber, main valve means in said bore that is operable from a first condition blocking fluid flow from the inlet port to the main chamber to a second condition permitting fluid flow from the inlet port to the main chamber, said main valve means including a first valve seat and means resiliently retained in abutting relationship to the first valve seat to block fluid flow therethrough, a dome mounted by the body and having a dome chamber opening to said bore in an axial direction toward the valve means and a reference pressure port opening to said dome chamber, valve operating and vent control means for operating the main valve means from its blocking condition to its second condition, sensor means mounted by the body in the main bore for blocking fluid flow from the dome chamber to the main chamber, having a sensing means passage from the main chamber that opens to the body vent passage second end when the reference pressure decreases to provide an increased pressure differential between the reference and outlet pressures that is greater than a preselected pressure differential, for cooperating with the control means to block fluid flow from the main chamber to the vent passage and operate the main valve means to an open condition when the outlet pressure decreases to increase the pressure differential between the outlet and reference pressures more than a preselected value, and to cooperate with the control means to block fluid flow from the main chamber to the body vent passage while the main valve means is retained in its blocking condition when the pressure differential between the outlet and reference pressure is within a limited range of said preselected value, the sensor means having a valve seat that in part defines the sensor means passage, annular sensor mount mounted by the regulator body in said intermediate bore portion and a sensor mounting the sensor means seat for movement therewith and mounted by the sensor mount for axial movement relative thereto between a position the sensor means valve seat abuts against the control means to block fluid flow through the last mentioned seat and a second position axially spaced from the control means, the sensor having a vent passage opening to the sensor means valve seat and to the sensor mount, the sensor mount having a vent passage opening to the sensor vent passage and to the body vent passage second end, a first end portion extending within the dome chamber and a second end portion to which the main chamber opens, the main valve means including an annular seat retainer that has the valve means seat mounted therein and being mounted by the body in the axial opposite bore portion, a spherical ball for abutting against the valve means valve seat to block fluid flow therethrough and means for mounting the ball in the seat retainer and resiliently retaining it in abutting relationship with the valve means valve seat while permitting fluid flow from the inlet port and through the last mentioned seat when the first ball is out of abutting relationship with the last mentioned seat, the control means being extended into the seat retainer and the valve means valve seat to abut against the first ball for moving it away from the last mentioned seat and being movable relative to the first ball, the main bore having an end opposite said surface, the regulator body having a wall portion closing the last mentioned end, and spring means in the dome chamber that abuts against the sensor for urging the sensor axially toward the main valve means, the sensor and sensor mount having cooperating diametric portions for limiting the axial movement of the sensor away from the main valve means, each of the intermediate bore portion and the sensor having a plurality of axially extending portions that are of progressively decreasing diameters in an axial direction toward the main valve means that are radially adjacent to one another, and the valve seats being made of tungsten carbide.

8. A pressure regulator adapted to be connected to sources of inlet and reference pressures and provide an outlet pressure that is higher than the reference pressure, comprising a regulator body having opposite first and second exterior surfaces, a main bore that is axially elongated, has a first end opening through the second surface, an axially opposite end that is closed by the regulator body and is axially intermediate said surfaces, a first end bore portion, a second bore portion that at least in part defines a main valve chamber, is of a larger diameter than the first end bore portion and opens to the first end bore portion, a third bore portion having a minimum diameter larger than the maximum diameter of the second bore portion and opens thereto, and a fourth bore portion having a minimum diameter larger than the maximum diameter of the third bore portion, opens to the third bore portion and opens through the second surface, an inlet port that is in fluid communication with the first bore portion, an outlet port in fluid communication with the main chamber, and a vent passage that opens to the third bore portion and through the valve regulator body to the ambient atmosphere, operable main valve means mounted in the first bore portion that is resiliently retained in a closed condition to block fluid flow from the first bore portion to the main chamber and is operable to permit fluid flow from the first bore portion to the main chamber, a dome mounted by the body to extend within the fourth bore portion and having a dome chamber opening axially toward the third bore portion and a reference pressure passage opening to the ambient atmosphere and to the dome chamber, a sensor mount mounted by the body in fluid sealing relationship with the dome and body and having an axially elongated bore opening to the dome chamber and the main chamber and a vent passage for placing the mount bore in fluid communication with the body vent passage, a control member mounted by the valve means for axial movement relative thereto to operate the valve means from its closed condition to an open condition, sensor means having a vent passage opening to the mount vent passage and toward the main chamber and extended within the mount bore in fluid sealing relationship therewith for movement axially between a first position spaced from the control member to provide an open fluid passage from the main chamber to the sensor mount passage when the reference pressure decreases in relationship to the outlet pressure to provide an outlet reference pressure differential that is less than a preselected value whereby fluid flows from the main chamber to the vent passages and permits the valve means blocking fluid flow from the inlet port to the main chamber, a second position abutting against the control member to have the control member block fluid flow from the main chamber to the sensor means vent passage and the valve means remain in its closed condition when the pressure differential between the outlet and reference pressures is within a limited range of the preselected pressure differential, and a third position for cooperating with the control member to block fluid flow from the main chamber to the vent passages and operate the valve means to an open condition when the outlet pressure decreases to increase the pressure differential between the outlet and reference pressures more than a preselected amount, and spring means within the dome chamber for resiliently urging the sensor means toward the control member, the sensor means including a sensor and a vent seat, the sensor having a bore portion that forms at least part of the sensor means vent passage and in which the vent seat is mounted for abutting against the control member to block fluid flow from the main chamber to the sensor means vent passage when the sensor means is in each of its second and third positions, the valve means including a seat retainer removably mounted in the first bore portion and having a bore extending axially therethrough, a valve seat, the retainer bore having bore portions of different diameters to mount the valve seat, a valve member for blocking fluid flow from the first bore through the valve seat and to the main chamber, and means mounted by the seat retainer for resiliently retaining the valve member in a position to block fluid flow through the valve seat, the control member being movably extended into the seat retainer and the valve seat for moving the valve member away from the valve seat when the sensor means is moved to its third position, the resilient retaining means including a spring retainer mounted by the seat retainer and having a bore extending axially therethrough to open to the seat retainer bore and to the first bore portion and that provides an annular shoulder, and a coil spring abutting against the last mentioned shoulder and the valve member to resiliently retain the valve member in abutting relationship to the valve seat, and the valve member comprising a plunger abutting against the spring and a spherical ball fixed to the plunger for abutting against the valve seat, the control member including an axially elongated connector extending into the seat retainer bore and the valve seat to abut against the first spherical ball for moving it away from the valve seat to permit fluid flow from the inlet port to the main chamber and being movable relative to the first ball, and a second spherical ball fixed to the connector to abut against the vent seat to block fluid flow from the main chamber to the vent passages when the sensor means is in each of its second and third positions.

9. A pressure regulator adapted to be connected to sources of inlet pressure and outlet pressure and provide a source of outlet pressure, comprising a regulator body having an exterior surface, an axially elongated main bore having an end portion opening through said surface, an axially opposite portion, an axially intermediate portion that in part defines a main chamber and an end opposite said surface, a vent passage having one end opening through the regulator body to the ambient atmosphere and an opposite second end opening to the main bore axially between the main chamber and said end portion, an inlet port opening to said axially opposite portion, an outlet port opening to said main chamber and a wall portion closing the main bore end that is opposite said surface, main valve means in said bore that is operable from a first condition blocking fluid flow from the inlet port to the main chamber to a second condition permitting fluid flow from the inlet port to the main chamber, said main valve means including a first valve seat and means resiliently retained in abutting relationship to the first valve seat to block fluid flow therethrough, a dome mounted by the body and having a dome chamber opening to said bore in an axial direction toward the valve means and a reference pressure port opening to said dome chamber, valve operating and vent control means for operating the main valve means from its blocking condition to its second condition, sensor means mounted by the body in the main bore for blocking fluid flow from the dome chamber to the main chamber, having a sensing means passage from the main chamber that opens to the body vent passage second end when the reference pressure decreases to provide an increased pressure differential between the reference and outlet pressures that is greater than a preselected pressure differential, for cooperating with the control means to block fluid flow from the main chamber to the vent passage and operate the main valve means to an open condition when the outlet pressure decreases to increase the pressure differential between the outlet and reference pressure more than a preselected value, and to cooperate with the control means to block fluid flow from the main chamber to the body vent passage while the main valve means is retained in its blocking condition when the pressure differential between the outlet and reference pressure is within a limited range of said preselected value, the sensor means having a valve seat that in part defines the sensor means passage, an annular sensor mount mounted by the regulator body in said intermediate bore portion and a sensor mounting the sensor means seat for movement therewith and mounted by the sensor mount for axial movement relative thereto between a position the sensor means valve seat abuts against the control means to block fluid flow through the last mentioned seat and a second position axially spaced from the control means, and spring means in the dome chamber to abut against the sensor for urging the sensor axially toward the main valve means, the sensor and sensor amount having cooperating diametric portions for limiting the axial movement of the sensor away from the main valve means, and each of the intermediate bore portion and the sensor mount having a plurality of axially extending portions that are of progressively decreasing diameters in an axial direction toward the main valve means that are radially adjacent to one another.

10. The regulator of claim 9 further characterized in that the main valve means includes an annular seat retainer having the valve means valve seat mounted therein and being mounted by the body in the axial opposite bore portion, a spherical ball for abutting against the valve means valve seat to block fluid flow therethrough and means for mounting the ball in the seat retainer and resiliently retaining it in abutting relationship with the valve means valve seat while permitting fluid flow from the inlet port and through the last mentioned seat when the ball is out of abutting relationship with the last mentioned seat, the control means being extended into the seat retainer and the valve means valve seat to abut against the ball for moving it away from the last mentioned seat and being movable relative to the ball.

11. A pressure regulator adapted to be connected to sources of inlet pressure and outlet pressure and provide a source of outlet pressure, comprising a regulator body having an exterior surface, an axially elongated main bore having an end portion opening through said surface, an axially opposite portion and an axially intermediate portion that in part defines a main chamber, a vent passage having one end opening through the regulator body to the ambient atmosphere and an opposite second end opening to the main bore axially between the main chamber and said end portion, an inlet port opening to said axially opposite portion, and an outlet port opening to said main chamber, main valve means in the main bore that is operable from a first condition blocking fluid flow from the inlet port to the main chamber to a second condition permitting fluid flow from the inlet port to the main chamber, said main valve means including a first valve seat, a spherical ball resiliently retained in abutting relationship to the first valve seat to block fluid flow therethrough, and a valve seat retainer mounted by the regulator body in the main bore for mounting the first valve seat, the valve seat retainer having a bore extending therethrough which opens through the valve seat, a dome mounted by the body and having a dome chamber opening to the main bore in an axial direction toward the valve means and a reference pressure port opening to said dome chamber, valve operating and vent control means for operating the main valve means from its blocking condition to its second condition, sensor means mounted by the body in the main bore for blocking fluid flow from the dome chamber to the main chamber, providing an open vent fluid passage from the main chamber that opens to the body vent passage second end when the reference pressure decreases to provide an increased pressure differential between the reference and outlet pressures that is greater than a preselected pressure differential, for cooperating with the control means to block fluid flow from the main chamber to the vent passage and move the first ball way from the valve seat to an open condition when the outlet pressure decreases to increase the pressure differential between the outlet and reference pressures more than a preselected value, and to cooperate with the control means to block fluid flow from the main chamber to the body vent passage while the main valve means is retained in its blocking condition when the pressure differential between the outlet and reference pressures is within a limited range of said preselected value, the control means including an axially elongated connector extended into the seat retainer retainer bore and the valve seat to abut against the first spherical ball for moving the first ball away from the valve seat to permit fluid flow from the inlet port to the main chamber and being movable relative to the first ball, and a second spherical ball fixed to the connector to abut against the sensor means to block fluid flow from the main chamber to the vent passages when the control means block fluid flow from the main chamber to the body vent passage.

* * * * *

UNITED STATES PATENT AND TRADEMARK OFFICE
CERTIFICATE OF CORRECTION

PATENT NO. : 4,693,267

DATED : September 15, 1987

INVENTOR(S) : Daryll D. Patterson

It is certified that error appears in the above-identified patent and that said Letters Patent is hereby corrected as shown below:

Column 2, line 63, Change "seted" to --seated--; and
Column 7, line 42, change "set" to --seat--.

Signed and Sealed this

Twenty-sixth Day of April, 1988

Attest:

DONALD J. QUIGG

Attesting Officer     Commissioner of Patents and Trademarks